United States Patent
Cao (12) 
(10) Patent No.: US 6,393,176 B1
(45) Date of Patent: May 21, 2002

(54) DENSE WAVELENGTH DIVISION MULTIPLEXER WHICH INCLUDES A DENSE OPTICAL CHANNEL COMB FILTER

(75) Inventor: Simon X. F. Cao, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/574,650

(22) Filed: May 18, 2000

Related U.S. Application Data (63) Continuation-in-part of application No. 09/401,686, filed on Sep. 23, 1999, now Pat. No. 6,205,270.

(51) Int. Cl.[7] .............................................. G02B 6/26
(52) U.S. Cl. .............................. 385/24; 385/11; 385/33
(58) Field of Search ................................ 385/24, 11, 33

(56) References Cited

U.S. PATENT DOCUMENTS

| | | | | |
|---|---|---|---|---|
| 5,796,889 A | * | 8/1998 | Xu etal. | 385/24 |
| 5,889,904 A | * | 3/1999 | Pan et al. | 385/24 |
| 6,023,542 A | * | 2/2000 | Pan et al. | 385/24 |

* cited by examiner

*Primary Examiner*—Hung N. Ngo
(74) *Attorney, Agent, or Firm*—Sawyer Law Group LLP (57) ABSTRACT

The present invention provides a dense wavelength division multiplexer for separating an optical signal into optical channels which minimizes channel leakage. The multiplexer includes at least one channel separator optically coupled to the inputting mechanism, and at least one dense optical channel comb filter optically coupled to the channel separator. In one embodiment, the dense optical channel comb filter includes: a lens optically coupled to the channel separator disposed at a distance equal to the focal length of the lens, a first birefringent wedge optically coupled to the lens at a side opposite to the channel separator, a second birefringent wedge optically coupled to the first birefringent wedge at a side opposite to the lens, and a non-linear interferometer optically coupled to the second birefringent wedge at a side opposite to the first birefringent wedge. The comb filter of the present invention provides an improved efficiency of separation of channels when used to supplement an optical channel separator. The present invention also provides a higher tolerance to drifts than is provided by conventional optical filters due to the increase in the widths of the pass bands. The materials required to manufacture and implement the dense optical channel comb filter in accordance with the present invention are readily available. The present invention thus does not require special or expensive materials or processes. It is thus cost effective.

19 Claims, 12 Drawing Sheets

DENSE WAVELENGTH DIVISION MULTIPLEXER WHICH INCLUDES A DENSE OPTICAL CHANNEL COMB FILTER

CROSS-REFERENCES TO RELATED APPLICATIONS

This application is a CONTINUATION-IN-PART of a U.S. Patent Application entitled "Dense Wavelength Division Multiplexer Which Includes A Dense Optical Channel Comb Filter", Ser. No. 09/401,686, filed on Sep. 23, 1999 now U.S. Pat. No. 6,205,270.

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple signals and/or wavelengths may be transmitted simultaneously over the same optical fiber. For purposes of this discussion, a signal is a single stream of logical information carried by an optical fiber and a compound signal is the totality of all such simultaneously transmitted signals. If each signal carried in a particular direction along an optical fiber corresponds to a separate wavelength, then the network is a wavelength multiplexed system.

A crucial feature of a wavelength-multiplexed fiber optic network is the separation of a compound optical signal into its component single-wavelength signals, or "channels," typically by a dense wavelength division multiplexer. This separation must occur for the exchange of wavelengths between signals on communications "loops" within networks to occur. As the demand for information carrying capacity over existing fiber networks continues to grow, the performance constraints on optical network components continue to become more severe.

One potential difficulty with optical channel separators in wavelength multiplexed systems with dense channel packing is imperfect optical separation or add-drop performance as a result of imperfections in optical components. Such imperfections would include unwanted reflections of light at nominally transparent components, unwanted transmissions of light through nominally reflective components, and light scattering from surface roughness of nominally flat surfaces. All such imperfections lead to stray light that can propagate in random and uncontrollable directions. The presence of this stray light can cause signals to propagate along undesired and incorrect pathways, thereby causing imperfect isolation of one set of signals from another. Such imperfect channel separation can cause signals to branch to incorrect portions of the network and can ultimately lead to contamination, for instance, of a signal comprising a particular wavelength channel with spurious incorrectly routed signals carried on the same channel.

Figure 1:
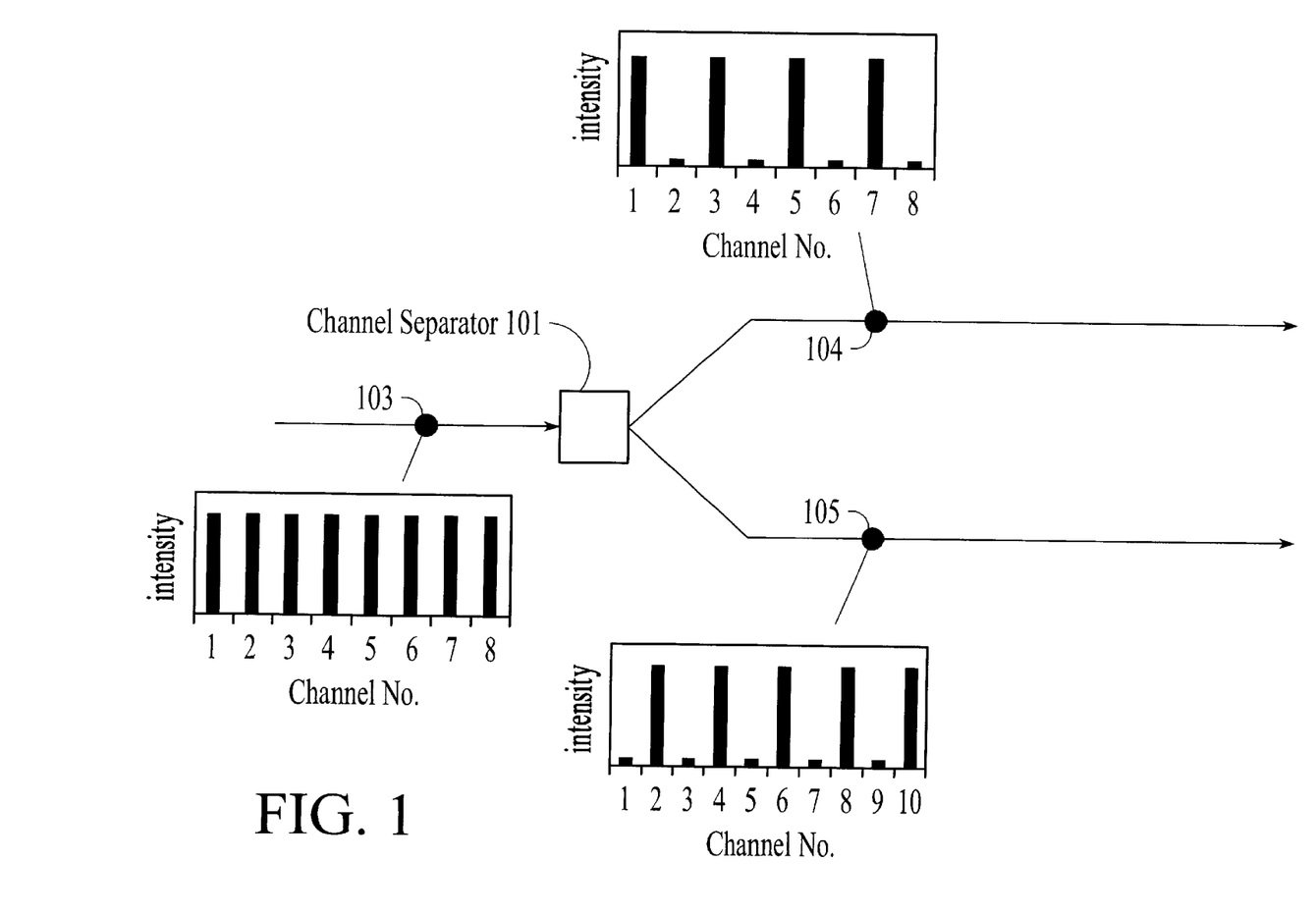
FIG. 1 is a schematic representation of optical channels are they are transmitted through a channel separator.

As an example, FIG. 1 shows a schematic representation of optical channels as they are transmitted through a dense optical channel separator. A three-port channel separator 101 initially separates an initial optical input signal 103, comprised of a plurality of optical channels, into two sub-signals, a first sub-signal 104 comprised primarily of "odd" channels and a second sub-signal 105 comprised primarily of "even" channels, respectively. Histograms attached to each signal and sub-signal represent, hypothetically, the intensities of the channels comprising each. If the channel separator 101 is perfect then the sub-signal 104 is comprised only of odd channels and the sub-signal 105 is comprised only of even channels. However, since, in general, the separator 101 is not perfect, there is some "leakage" of even channels into sub-signal 104 and of some odd channels into sub-signal 105. Depending upon the level of isolation between sets of channels required by the wavelength multiplexed system, these spurious channel signals could provide unacceptable cross talk if, for instance, new sets of even and odd channels, respectively, are subsequently added to the sub-signals 104 and 105, as illustrated in FIG. 1.

Accordingly, there exists a need for a mechanism for minimizing channel leakage in a dense wavelength division system. The mechanism should be easy to manufacture and be cost effective. The present invention addresses such a need.

SUMMARY OF THE INVENTION

The present invention provides a dense wavelength division multiplexer for separating an optical signal into optical channels which minimizes channel leakage. The multiplexer includes at least one channel separator optically coupled to the inputting mechanism, and at least one dense optical channel comb filter optically coupled to the channel separator. In one embodiment, the dense optical channel comb filter includes: a lens optically coupled to the channel separator disposed at a distance equal to the focal length of the lens, a first birefringent wedge optically coupled to the lens at a side opposite to the channel separator, a second birefringent wedge optically coupled to the first birefringent wedge at a side opposite to the lens, and a non-linear interferometer optically coupled to the second birefringent wedge at a side opposite to the first birefringent wedge. The comb filter of the present invention provides an improved efficiency of separation of channels when used to supplement an optical channel separator. The present invention also provides a higher tolerance to drifts than is provided by conventional optical filters due to the increase in the widths of the pass bands. The materials required to manufacture and implement the dense optical channel comb filter in accordance with the present invention are readily available. The present invention thus does not require special or expensive materials or processes. It is thus cost effective.

DETAILED DESCRIPTION

The present invention provides a mechanism for minimizing channel leakage in a dense wavelength division system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A dense wavelength division multiplexer in accordance with the present invention utilizes a dense optical channel comb filter which comprises at least one birefringent wedge and a non-linear interferometer to minimize channel leakage. To more particularly describe the features of the present invention, please refer to FIGS. 2 through 12 in conjunction with the discussion below.

Figure 2:
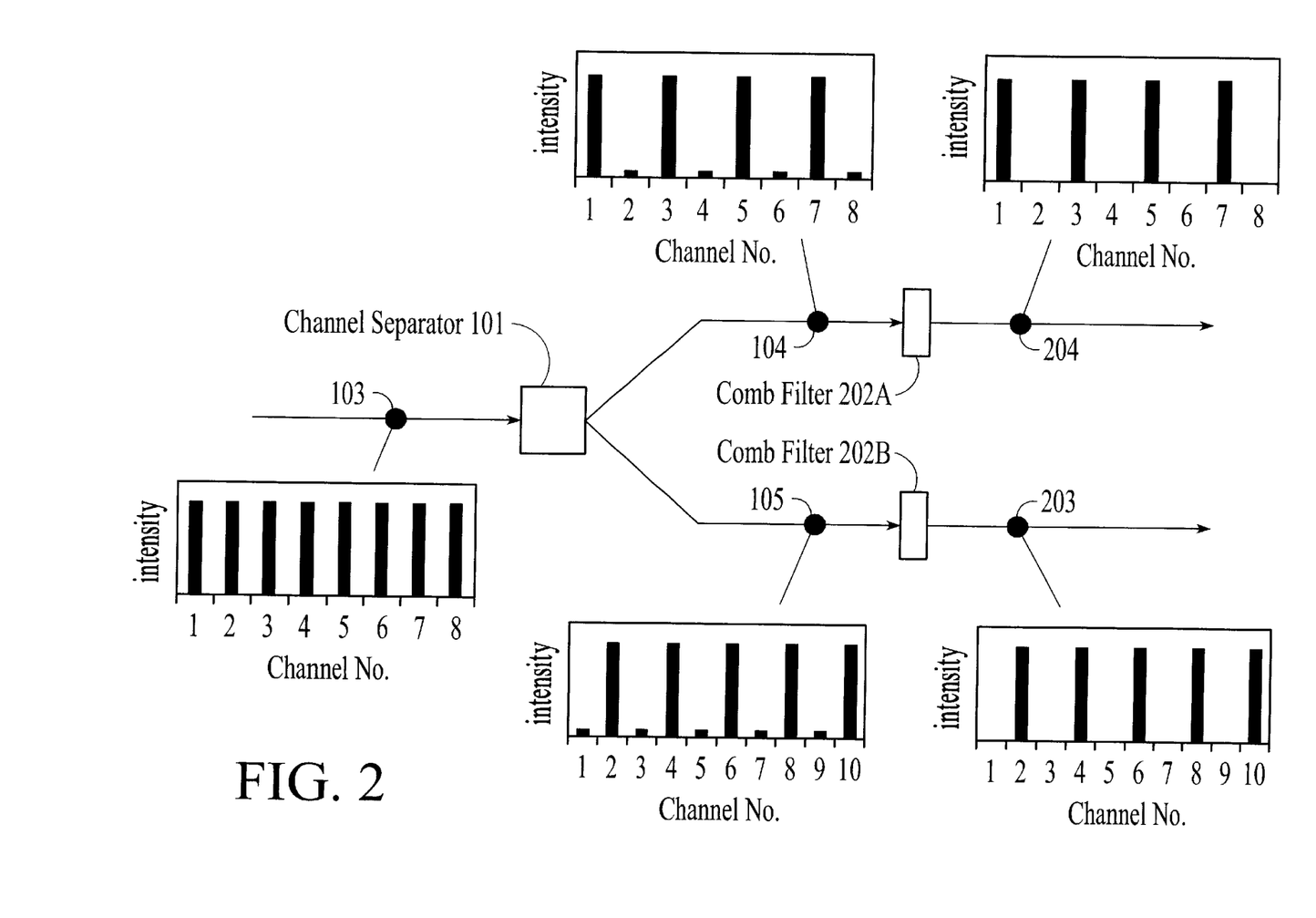
FIG. 2 is a schematic representation of optical channels as they are transmitted through a channel separator supplemented by a dense optical channel comb filters in accordance with the present invention.

FIG. 2 is a schematic representation of optical channels as they are transmitted through a channel separator supplemented by dense optical channel comb filters of the present invention. To increase the degree of isolation of the odd channel sub-signal 104 from the even channels and of the even channel sub-signal 105 from the odd channels, two dense optical channel comb filters, 202A and 202B, respectively, may be inserted into the system. Each of the first and second dense optical channel comb-filters 202A and 202B transmits a high proportion of the intensity of the odd and even channels, respectively and a negligible proportion of the intensity of the even and odd channels, respectively. Taken together, the channel separator 101 and each of the dense optical-channel comb filters 202A and 202B provide an acceptable level of isolation of the resulting odd channel and even channel sub-signals, 204 and 203, respectively. A separate channel separator could be used in place of each of the comb filters 202A and 202B to accomplish a similar result. However, the use of such extra channel separators would be expensive and wasteful, as the comb filters are generally of simpler design and construction than the separators.

Figure 3:
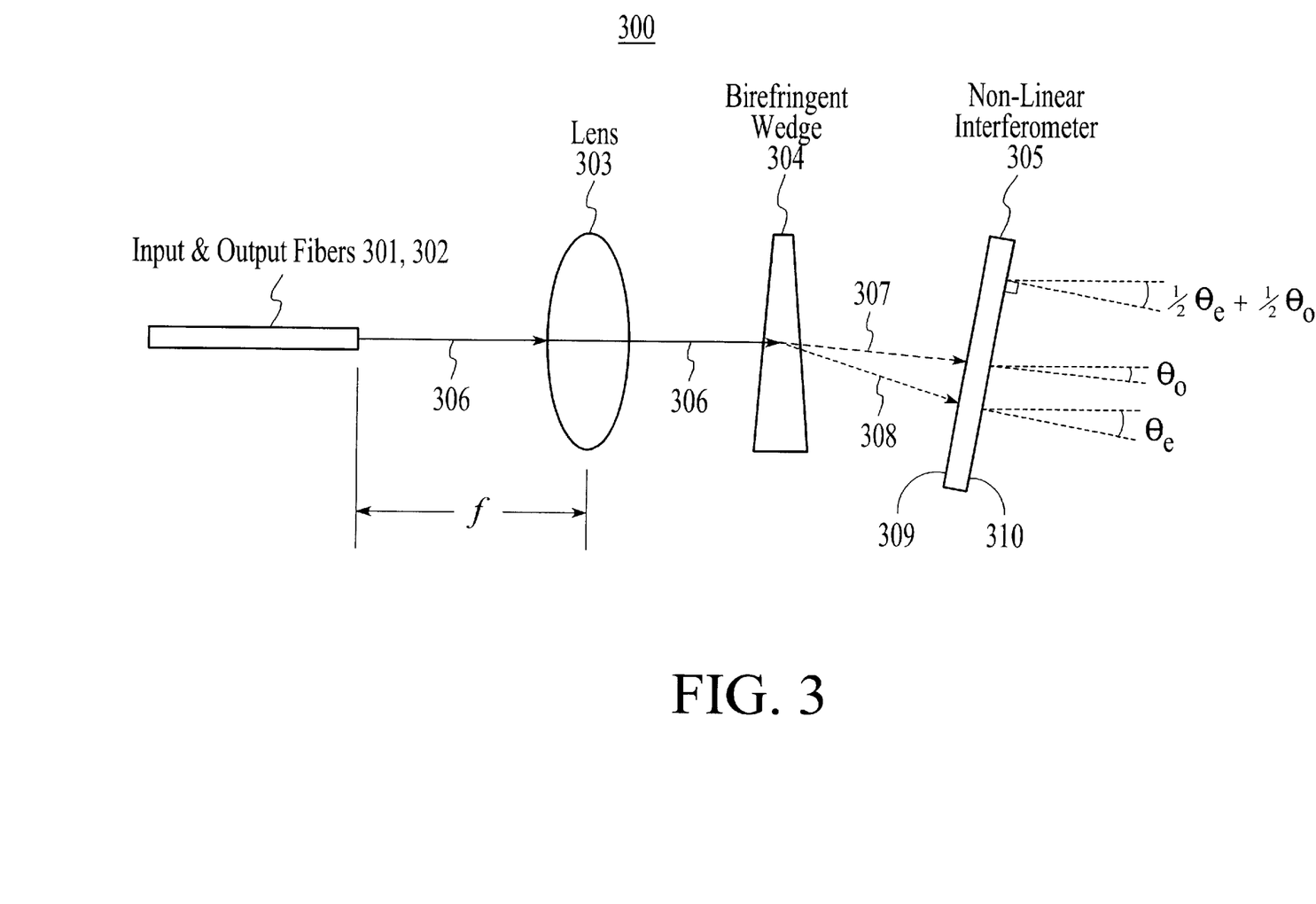
FIG. 3 is a side view of a first preferred embodiment of a dense optical channel comb filter in accordance with the present invention.

FIG. 3 shows a side view of a first preferred embodiment of a dense optical channel comb filter 200 in accordance with the present invention. The dense optical channel comb filter comprises two optical fibers 301, 302 mounted in parallel and disposed side by side. Fiber 301 is used for signal input and fiber 302 is used for signal output. For geometric reference, the common axis of the two fibers 301 an d 302 defines the axis of comb filter 300. The comb filter 300 also comprises a lens 303, a wedge-shaped plate 304 composed of a birefringent material such as calcite or rutile, and a non-linear interferometer 305.

In the first preferred embodiment, the lens 303 is disposed such that it is centered on the comb filter axis at a distance from the end faces of input fiber 301 and output fiber 302 equivalent to its focal length, $f$. Also, the birefringent wedge 304 is disposed along the filter axis to the opposite side of the lens 303 from fibers 301 and 302, and the non-linear interferometer 305 is disposed to the opposite side of wedge 304 from lens 303. A major dimension of the non-linear interferometer 305 is oriented at an angle to the comb filter main axis as described in more detail following.

Through the well-known double-refraction effect, the birefringent wedge 304 causes a physical decomposition of any unpolarized light beam propagating therethrough such that, after having passed through the wedge 304, the energy of the beam will be distributed among two separate beams propagating in different directions, one from the other, and plane polarized at right angles to one another. If the incident beam comprises a signal 306 as shown in FIG. 3, then the two emergent beams from wedge 304 comprise two sub-signals 307 and 308. The sub-signal 307 having the least deflection and the sub-signal 308 having the greatest deflection from the initial propagation direction of signal 306 comprise, respectively, an o-ray and an e-ray during their traverse through wedge 304. Such o-rays and e-rays are well known in the art and are not further discussed here. As shown in FIG. 3, the angles of deflection of emergent sub-signal 307 and of emergent sub-signal 308 relative to the initial propagation direction of signal 306 are defined as $\theta_o$ and $\theta_e$, respectively. In FIG. 3, as well as in subsequent figures, signal 306 is illustrated as a solid line whereas sub-signals polarized consonant with o-rays and e-rays are illustrated as dashed and dotted lines, respectively. Although each of these (sub-)signals is illustrated as a single line, it is to be understood that each of these lines represents the central axis of a beam or sheath of parallel light rays.

The non-linear interferometer 305 is an instance of an invention disclosed in a copending U.S. Patent Application entitled "Nonlinear Interferometer for Fiber Optic Wavelength Division Multiplexer Utilizing a Phase Differential Method of Wavelength Separation," Ser. No. 09/247,253, filed on Feb. 10, 1999. Applicant hereby incorporates this patent application by reference.

Figure 4:
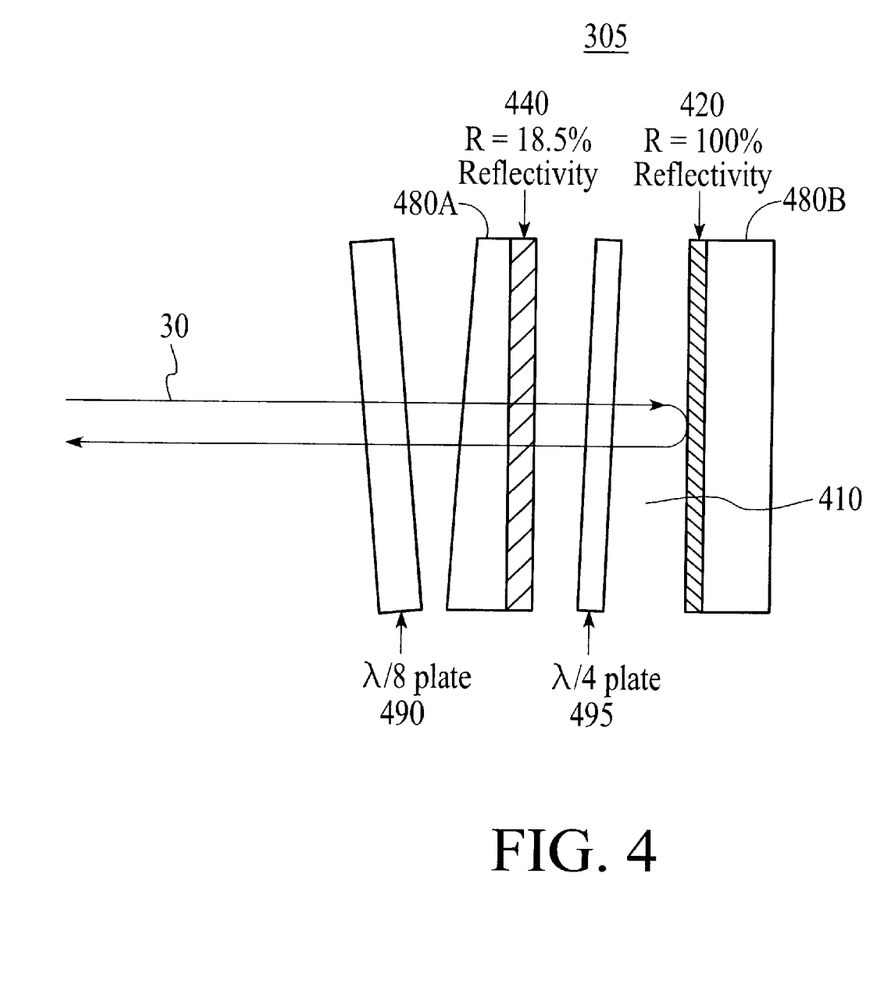
FIG. 4 is an illustration of a preferred embodiment of a non-linear interferometer in the first preferred embodiment of the dense optical channel comb filter in accordance with the present invention.

FIG. 4 illustrates a top view of a preferred embodiment of an interferometer disclosed in Patent Application Ser. No. 09/247,253. The interferometer 305 comprises two parallel glass plates 480A and 480B with a space or cavity 410 therebetween. The inside face of the glass plate 480B is coated with a layer of reflective coating 420 with a reflectivity preferably of 100%. The inside face of the glass plate 480A is coated with a layer of reflective coating 440 with a reflectivity preferably of approximately 18%. A quarterwave plate is disposed within the space 410 and an eighth-wave plate is disposed adjacent to plate 480A and external to the space 410.

When signal 30 enters the interferometer 305, it passes through the 18% reflective coating 440 and a waveplate 495 preferably of 8/4. The λ/4 plate 495 introduces an 180° round trip phase change between an o-beam and e-beam of the signal inside the cavity 410, and the external λ/8 plate 490 introduces a round trip 90° phase change between the o-beam and e-beam. The waveplate 490, preferably of λ/8, fine tunes the shape of the signal 30.

Any signal light ray impinging upon non-linear interferometer 305 is entirely reflected. However, the operation of the non-linear interferometer 305 is such that plane polarized light having a wavelength corresponding to every second channel (for instance, even-numbered channels) will be reflected with a 90° rotation of its plane of polarization whereas plane polarized light having wavelengths corresponding to the remaining channels (for instance odd-numbered channels) will be reflected without a change in polarization. The non-linear interferometer 305 is comprised, in part, of parallel reflective or partially reflective surfaces 309 and 310, which are equivalent to the glass plate surfaces with coatings 440 and 420, respectively, as shown in FIG. 4. If the main or central axis of nonlinear interferometer 305 is taken as the direction perpendicular to these two parallel surfaces 309 and 310, then, the non-linear interferometer 305 is oriented such that its main axis is disposed at an angle equivalent to (½$\theta_e$+½$\theta_o$) with respect to the initial x-axis or propagation direction of signal 306, as illustrated in FIG. 3.

Figure 5:
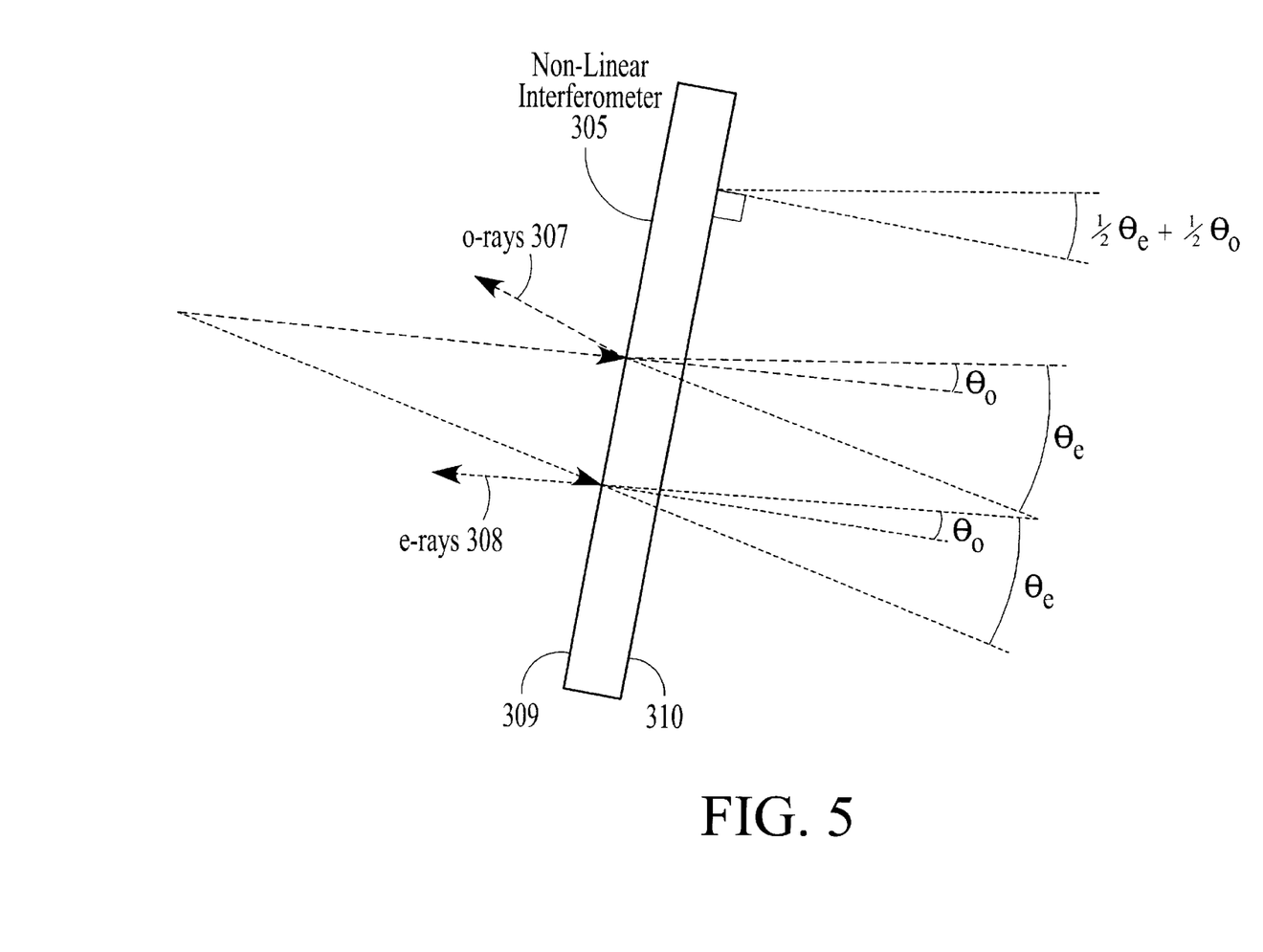
FIG. 5 is an enlarged side view of the non-linear interferometer in the first preferred embodiment of the dense optical channel comb filter of the present invention.

An enlarged diagram of the non-linear interferometer 305 and the directions of subsignal rays 307 and 308 reflected from it are shown in FIG. 5. The non-linear interferometer 305 reflects sub-signals that impinge upon it and the direction taken by the reflected portions of the sub-signals are determined as if the non-linear interferometer 305 were a simple mirror. The reflection direction is not affected by whether the sub-signals comprise odd channels or even channels. Because non-linear interferometer 305 is disposed such that its axis makes an angle of (½$\theta_e$+½$\theta_o$) with respect to the positive x-axis, then it is easily shown by simple geometry and the reflection law that the reflected portions of sub-signals 307 and 308 make angles of ($\pi+\theta_e$) and ($\pi+\theta_o$), respectively, with respect to the direction of the positive x-axis. That is, the reflected portions of sub-signals 307 and 308 make angles of $\theta_e$ and $\theta_o$, respectively, with respect to the x-axis, taken without regard to direction. Thus, as shown in FIG. 5, the reflected portion of sub-signal 307 is parallel to the pre-reflection portion of sub-signal 308 and the reflected portion of sub-signal 308 is parallel to the pre-reflection portion of sub-signal 307.

Figure 6:
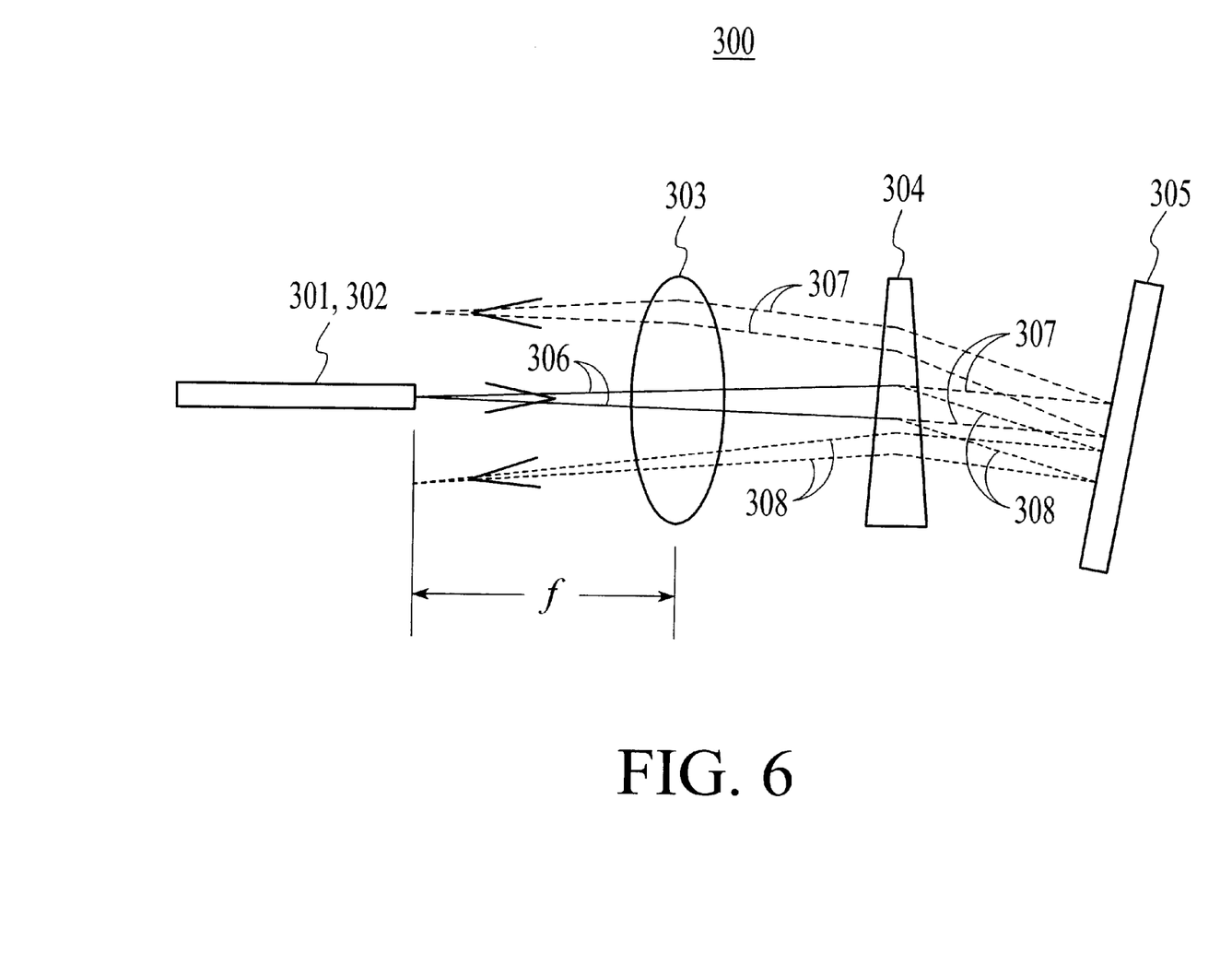
FIG. 6 is an illustration of the optical pathways of signals comprising odd channels through the first preferred embodiment of the dense optical channel comb filter in accordance with the present invention.

The operation of the dense optical channel comb filter 300 is now described with reference to FIGS. 6 and 7 which illustrate the pathways of odd- and even-channel signals, respectively, through comb filter 300. In these two figures, the positive x-axis is taken as the main axis of comb filter 300 in the direction of initial propagation of signal 306. The light of signal 306 emerges from fiber 301 as a diverging cone. Because lens 303 is centered at a distance,$f$, from the face of fiber 301 from which this signal light emanates, the lens 303 intercepts this diverging signal 306 and collimates it into a parallel beam as shown in both FIGS. 6 and 7. After passing through lens 303, the signal 306 propagates along the positive x-axis until it is intercepted by the birefringent wedge 304. After passing through the wedge 304, the signal 306 is separated into two collimated sub-signals 307 and 308 whose propagation directions are at angles of $\theta_o$ and $\theta_e$, respectively, with respect to the positive x-axis.

The two sub-signals 307 and 308 travel to and are reflected by the non-linear interferometer 305. After reflection by non-linear interferometer 305 both sub-signals 307 and 308 pass through birefringent wedge 304 in the reverse direction. Two separate cases may be distinguished, depending upon whether sub-signals 307 and 308 belong to the set of odd channels or to the set of even channels, illustrated in FIGS. 6 and 7, respectively. If sub-signals 307 and 308 are of a wavelength belonging to the set of odd channels, then no change in polarization direction occurs during reflection by the non-linear interferometer 305. Thus, if they are of the set of odd channels, sub-signal 307 and sub-signal 308 maintain polarization directions consonant with their original identities, during their forward traverse through wedge 304, as an o-ray and an e-ray, respectively, and are thus deflected by angles of $-\theta_o$ and $-\theta_e$, respectively, during their return traverse through this wedge.

Conversely, if sub-signals 307 and 308 are of a wavelength belonging to the set of even channels, then they incur a 90° rotation of their respective polarization directions during reflection by the non-linear interferometer 305. Thus, if they are of the set of even channels, sub-signal 307 and sub-signal 308 are characterized by polarization directions consonant with e-rays and o-rays, respectively, during their return traverse through wedge 304 and are thus deflected by angles of $-\theta_e$ and $-\theta_o$, respectively, during their return traverse through this wedge. As a result, after passing through wedge 304 in the reverse direction, the odd-channel sub-signals 307 and 308 propagate along directions given by $(\pi+\theta_e-\theta_0)>\pi$ and $(\pi+\theta_o-\theta_e)<\pi$, respectively, with regard to the positive x-axis and the even-channel sub-signals 307 and 308 propagate along directions given by $(\pi+\theta_e\theta_e)=\pi$ and $(\pi+\theta_o-\theta_o)=\pi$, respectively, with regard to the positive x-axis.

After passing through wedge 304 in the return direction, the collimated beam sub-signals 307 and 308 are intercepted by lens 303 which brings each to a focus on the side of lens 303 facing the fibers 301 and 302. As shown in FIG. 6, because the returning odd-channel sub-signals 307 and 308 do not propagate parallel to the negative x-axis prior to intercepted by lens 303, they are brought to separate foci which do not coincide with the output fiber 302. Such sub-signals are thus lost from the system.

Figure 7:
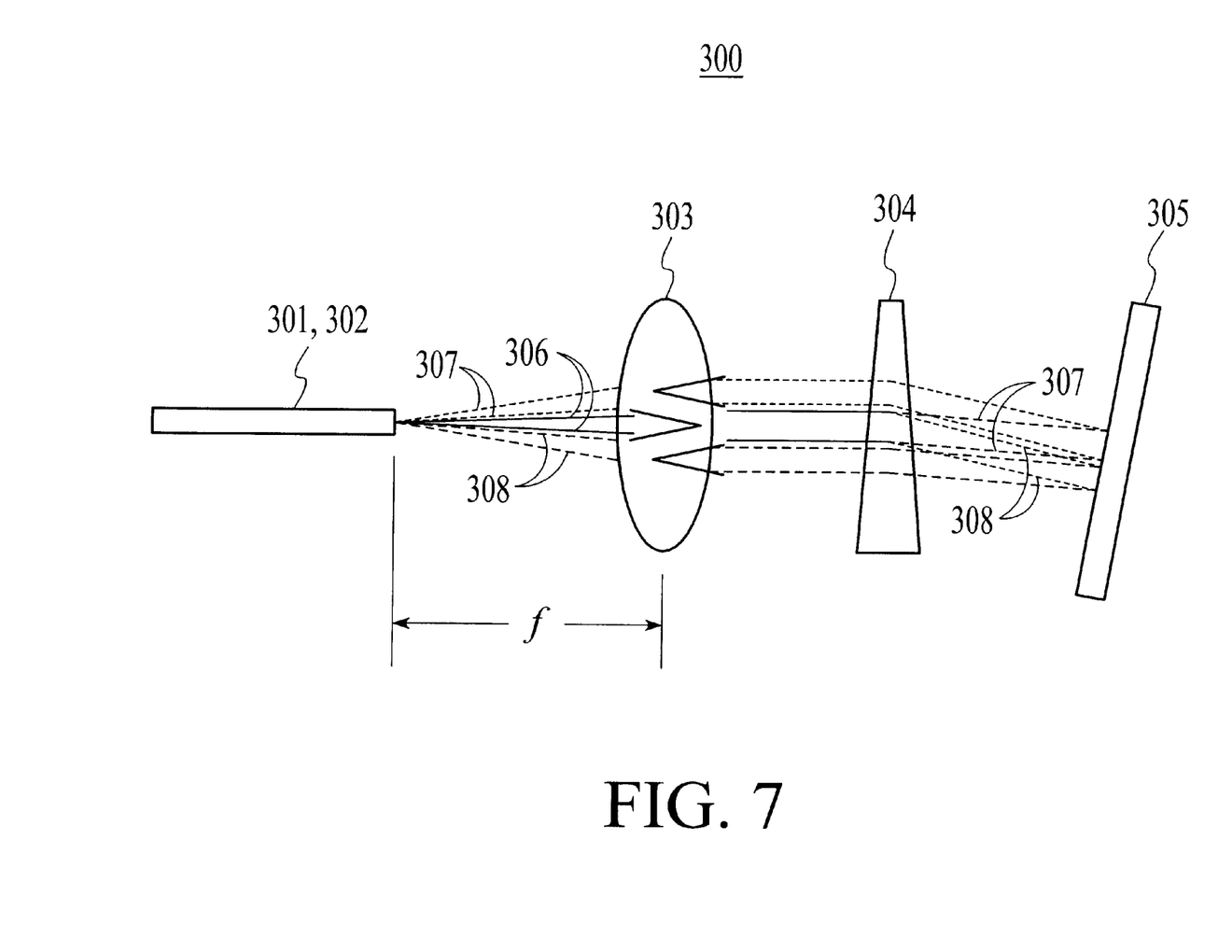
FIG. 7 is an illustration of the optical pathways of signals comprising even channels through the first preferred embodiment of the dense optical channel comb filter in accordance with the present invention.

Conversely, as shown in FIG. 7, returning even-channel sub-signals 307 and 308 propagate parallel to the negative x-axis as they are intercepted by lens 303, and are thus brought to foci that are coincident with each other and also with the lens focal point. Since output fiber 302 is also disposed at the focal point of lens 303, these even-channel sub-signals are intercepted by and transferred to output fiber 302. The even-channel signals 306 are thus regenerated at output fiber 302 from the convergence of the even-channel sub-signals 307 and 308. In this manner, the filter 300 performs as a dense optical channel comb filter that transfers signals belonging to the set of even channels from input fiber 301 to output fiber 302 while simultaneously rejecting signals belonging to the odd channels.

Figure 8:
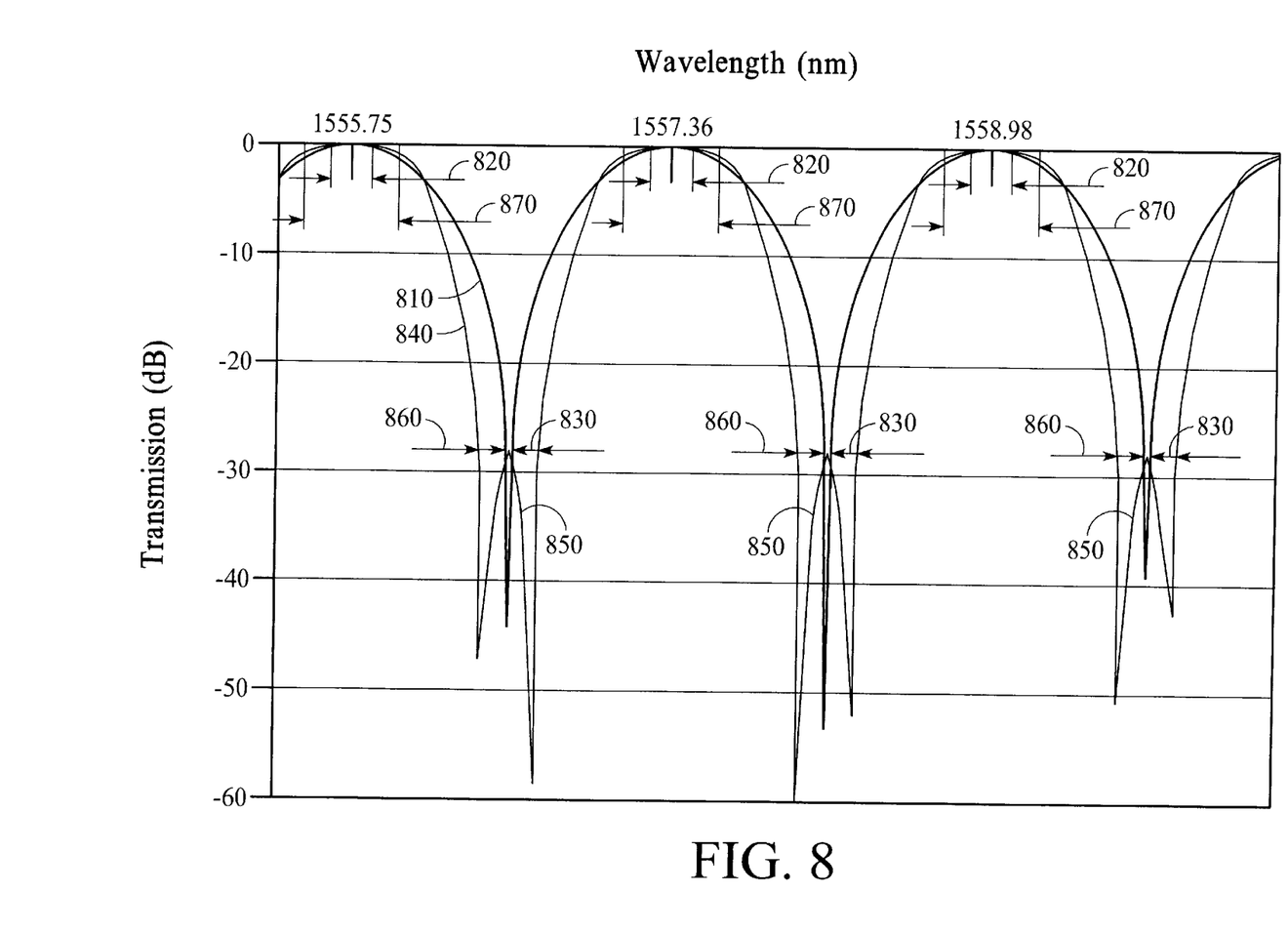
FIG. 8 is a graph of two sample spectrum curves, each comprised of several channels, as they enter, respectively, a conventional wavelength division multiplexer and a dense optical channel comb filter in accordance with the present invention.

As described above, the dense optical channel comb filter 300 of the present invention creates an advantage, when used in conjunction with a dense optical channel separator, of increased isolation of the odd channel and the even channel sub-signals from one another. Furthermore, the present invention has the added advantage of increased stability against offset and drift, in comparison to conventional optical components. This is illustrated in FIG. 8, which shows a sample spectrum curve 810 composed of numerous channels as it propagates through the components of a fiber optic communications system. Using conventional components, this composite signal must conform to a set of very narrow pass bands. Narrow pass bands of optical components are problematic because, due to the physical limitations and temperature sensitivity of signal source laser devices, they never emit light exactly at the center wavelengths of such pass bands. The difference between the actual wavelength and the wavelength at the center of the pass band is the "offset." The amount of offset or change in offset ("drift") ideally should not be larger than the widths of the pass bands. Otherwise, the crosstalk between channels will be too large.

The typical optical channel spectrum curve 810 associated with conventional components has no crosstalk but has a very narrow isolation band 830 and a very narrow pass band 820. The spectrum curve 840 of the dense optical channel comb filter 300 of the present invention has a different shape as a result of the properties of the non-linear interferometer 305 of which it the comb filter is comprised. In the spectrum curve 840, there is a small amount of band shape distortion 850, a significantly wider isolation band 860, and flatter curve tips which result in a wider pass band 870. Thus, the optical channel comb filter 300 of the present invention conforms to wider pass and isolation bands than do conventional optical components, thereby making the curve more stable and tolerant to channel offset and drift and less susceptible to cross talk.

The dense optical channel comb filter 300 in accordance with the present invention has been described as a device that allows passage therethrough of even channels while simultaneously prohibiting passage of odd channels. However, it will be understood by one of ordinary skill in the art that this invention may also be constructed so as to allow passage of odd channels while prohibiting passage of even channels without departing from the spirit and scope of the present invention. Such a modification is readily performed by adjusting the properties of the non-linear interferometer 305 such that, for instance, light rays of wavelengths corresponding to odd channels are reflected therefrom with polarization rotation whilst light rays of wavelengths corresponding to even channels are reflected therefrom without polarization rotation. Indeed, the use of "odd channel" and "even channel" terminology in this specification is made for the convenience of the reader only and does not imply restriction of the present invention to any particular optical channel enumeration scheme or wavelength spacing. Adaptation of the present invention for use with any one of numerous optical channel configurations and or systems will be understood by one of ordinary skill in the art and is within the spirit and scope of the present invention.

The references to o-rays and e-rays in the foregoing discussion are generally applicable to a birefringent wedge 304 comprised of a material having a uniaxial positive birefringence, such as, for instance, single crystal rutile. For a wedge comprised of another birefringent material having a uniaxial negative birefringence, such as, for instance, calcite or lithium niobate, the positions of e-rays and o-rays will generally be reversed from that in the foregoing discussion, although the same general principles still apply.

For most birefringent materials, there is a variation with both wavelength and with temperature of the two principle refractive indices, $n_o$ of the o-ray and $n_e$ and of the e-ray, within the birefringent wedge 304 of the dense optical comb filter 300 (FIG. 3). Because of this variation, the average deflection angle $\theta_d = \frac{1}{2}\theta_e + \frac{1}{2}\theta_o$ varies with both wavelength and temperature. The tilt angle of the non-linear interferometer 305 is fixed at a nominal deflection angle of $\theta°_d = \frac{1}{2}\theta°_e + \frac{1}{2}\theta°_o$ where $\theta°_e$ and $\theta°_o$ are the nominal deflection angles of e-rays and o-rays, respectively, averaged over both wavelength and temperature.

The dense optical comb filter 300 works correctly when, immediately after reflection from the non-linear interferometer 305, the reflected o-rays 307 make an angle of $\theta_e$ with the horizontal and the reflected e-rays 308 make an angle of $\theta_o$ with the horizontal, as illustrated in FIG. 5. This condition is met when the average deflection angle $\theta_d$ is equal to the fixed tilt angle $\theta°_d$. The comb filter 300 is both wavelength-dependent and temperature-dependent. If the variation of $\theta_d$ is too great, then the light rays comprising the desired set of optical channels fail to converge onto the center of the output fiber 302 and the insertion loss of the apparatus increases to undesirable levels. To counteract the wavelength and temperature variation of $\theta_d$, a second preferred embodiment of the dense optical comb filter in accordance with the present invention is provided as illustrated in FIGS. 9–12.

Figure 9:
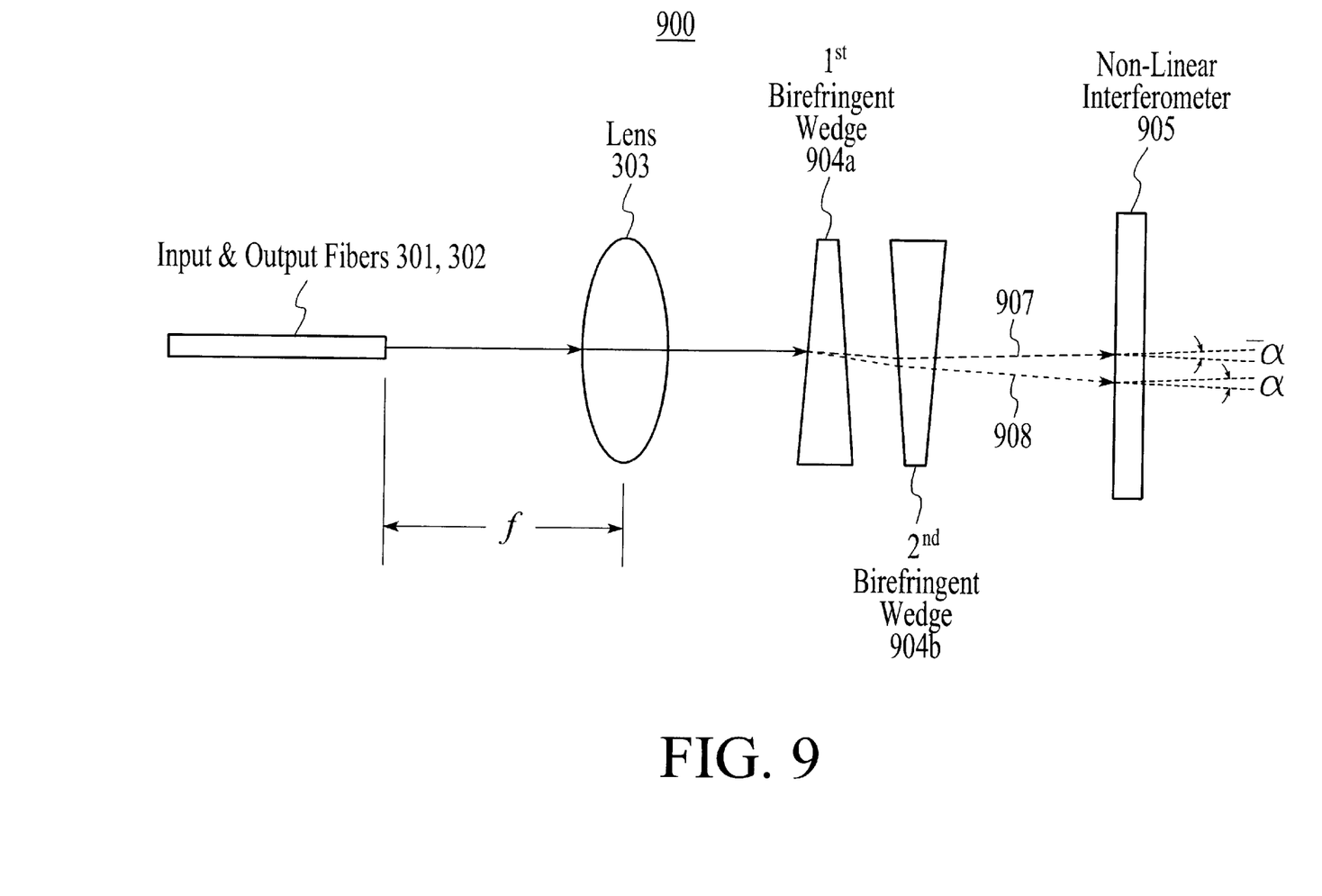
FIG. 9 is a side view of a second preferred embodiment of the dense optical channel comb filter in accordance with the present invention.

FIG. 9 illustrates a side view of the second preferred embodiment of the dense optical comb filter in accordance with the present invention. The dense optical comb filter 900 is configured such that, for all temperatures and wavelengths, the average deflection angle is zero, that is $\theta_d = 0$. In the dense optical comb filter 900 (FIG. 9), the input and output fiber 301–302 and the lens 303 are disposed similarly to the respective similarly numbered components of comb filter 300 (FIG. 3). In the comb filter 900 (FIG. 9), a first birefringent wedge 904a and a second birefringent wedge 904b replace the single birefringent wedge 304 of the comb filter 300 (FIG. 3) and an un-tilted non-linear interferometer 905 replaces the tilted non-linear interferometer 305. Except for the change in tilt angle, the non-linear interferometer 905 of comb filter 900 is similar to the non-linear interferometer 305 of comb filter 300.

Figure 10:
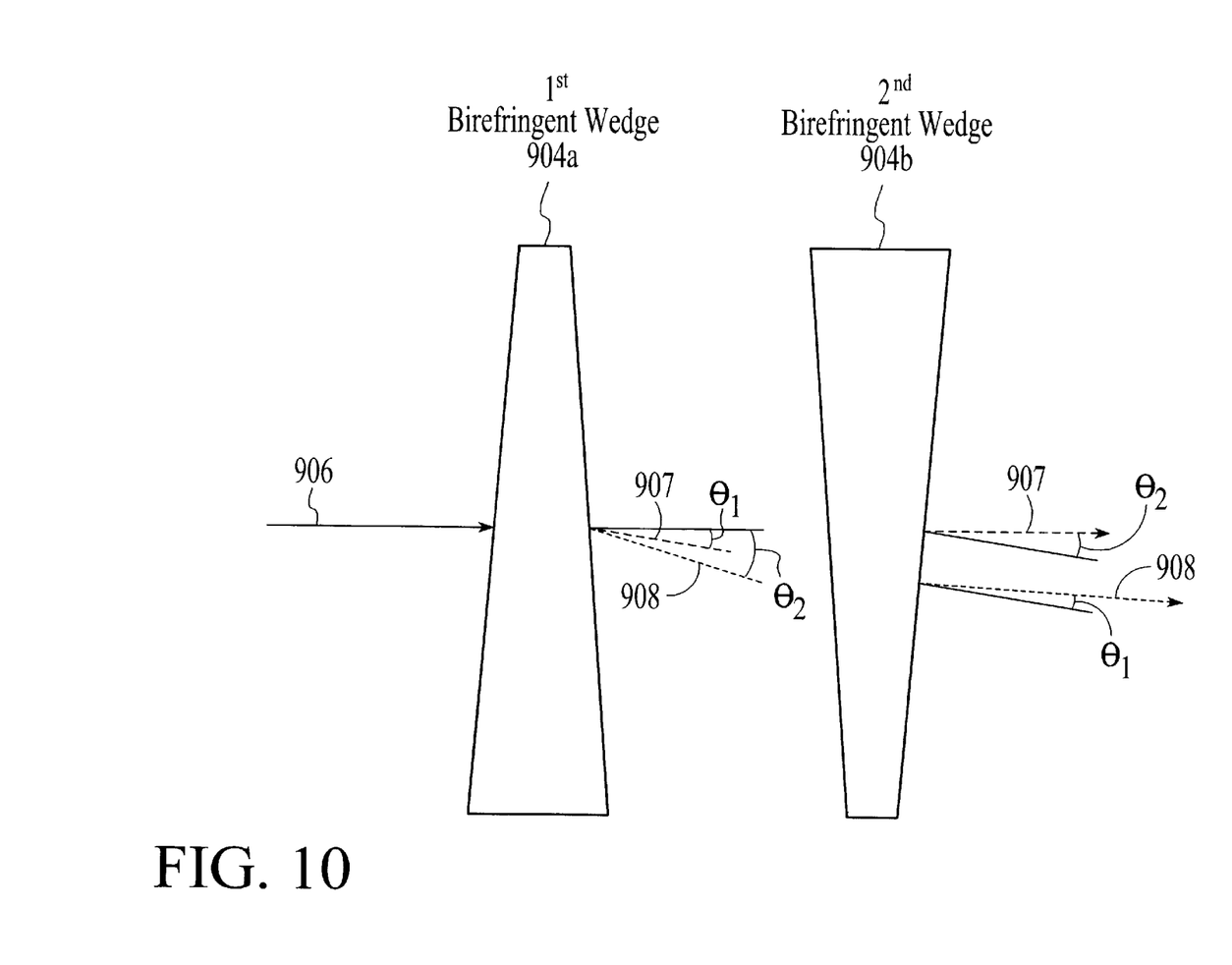
FIG. 10 is an enlarged side view of the two birefringent wedges comprising the second preferred embodiment of the dense optical channel comb filter in accordance with the present invention.

FIG. 10 illustrates an expanded view of the two birefringent wedges 904a–904b comprising the second preferred embodiment of the dense optical comb filter in accordance with the present invention. The two wedges 904a–904b comprise identical materials and shapes except that the second wedge 904b is inverted relative to the first wedge 904a. Also, the respective optic axes of the birefringent wedges 904a–904b are disposed perpendicular to one another such that one optic axis is substantially vertical within the plane of FIG. 10 and the second optic axis is perpendicular to the plane of FIG. 10. Under these conditions, a signal 906 incident upon the first birefringent wedge 904a is separated, upon traversing through the wedge, into a first, less-deflected sub-signal 907 and a second, more-greatly deflected sub-signal 908. Each of the sub-signals 907–908 comprises polarized light wherein the two respective polarization directions are perpendicular to one another. The sub-signal 907 and the sub-signal 908 are deflected, from the original propagation direction of signal 906, by angles of $\theta_1$ and $\theta_2$, respectively. The magnitudes of these two angles depend upon the magnitudes of the two principle refractive indices, $n_o$ and $n_e$, of the birefringent wedge parallel and perpendicular to the optic axis and are temperature- and wavelength-dependent.

Upon exiting the first birefringent wedge 904a, the two sub-signals 907–908 are directed towards and into the second birefringent wedge 904b. Because the optic axis of the second birefringent wedge 904b is perpendicular to that of the first wedge 904a, the polarization of each of the sub-signals 907–908 is associated with a principal refractive index, within wedge 904b, that is different from the principal refractive index with which is was associated within wedge 904a. In other words, if sub-signal 908 is an e-ray in wedge 904a, then it is an o-ray in wedge 904b, and vice versa. Therefore, to a close approximation, the sub-signals 907 and 908 are deflected by angles of $-\theta_2$ and $-\theta_1$, respectively, upon passage through the birefringent wedge 904b.

Letting the angle a be defined as $\alpha=\theta_2-\theta_1$, then, as shown in FIG. 9, the net deflection of the sub-signal 908, upon passage through both wedges, is equal to $\theta_2-\theta_1=\alpha$ and the net deflection of sub-signal 907 is equal to $\theta_{1-\theta_2}=-\alpha$, relative to the initial propagation direction of the signal 906. The average deflection angle, $\theta_d$, and, consequently, the tilt angle of the non-linear interferometer 905, are therefore both equal to zero. According to this derivation, because the average deflection angle, $\theta_d$, is equal to zero regardless of the exact values of $\theta_1$ and $\theta_2$, then this angle, $\theta_d$, is, to a close approximation, independent of both wavelength and temperature.

Figure 11:
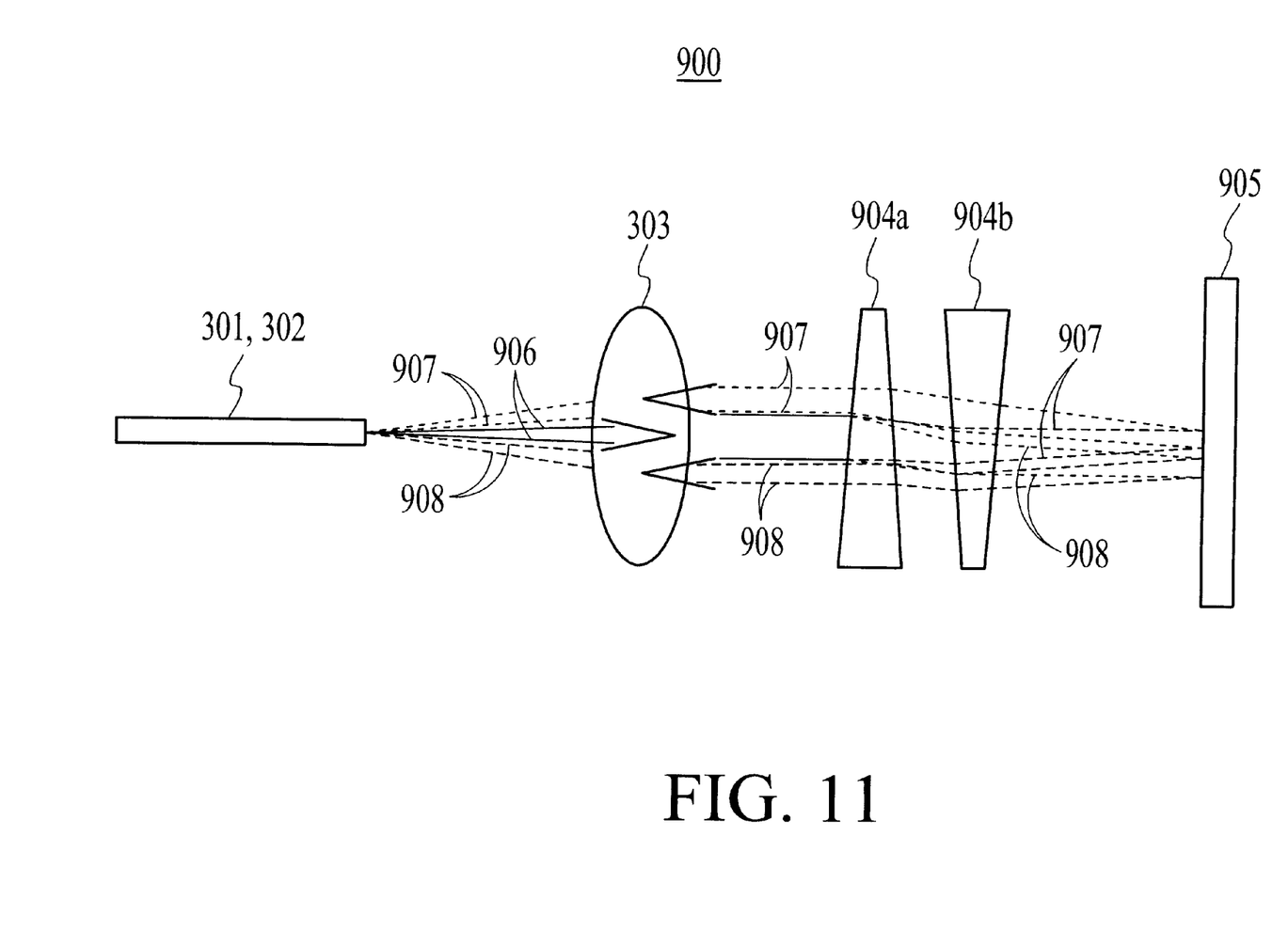
FIG. 11 is an illustration of the optical pathways of signals comprising even channels through the second preferred embodiment of the dense optical channel comb filter in accordance with the present invention.
Figure 12:
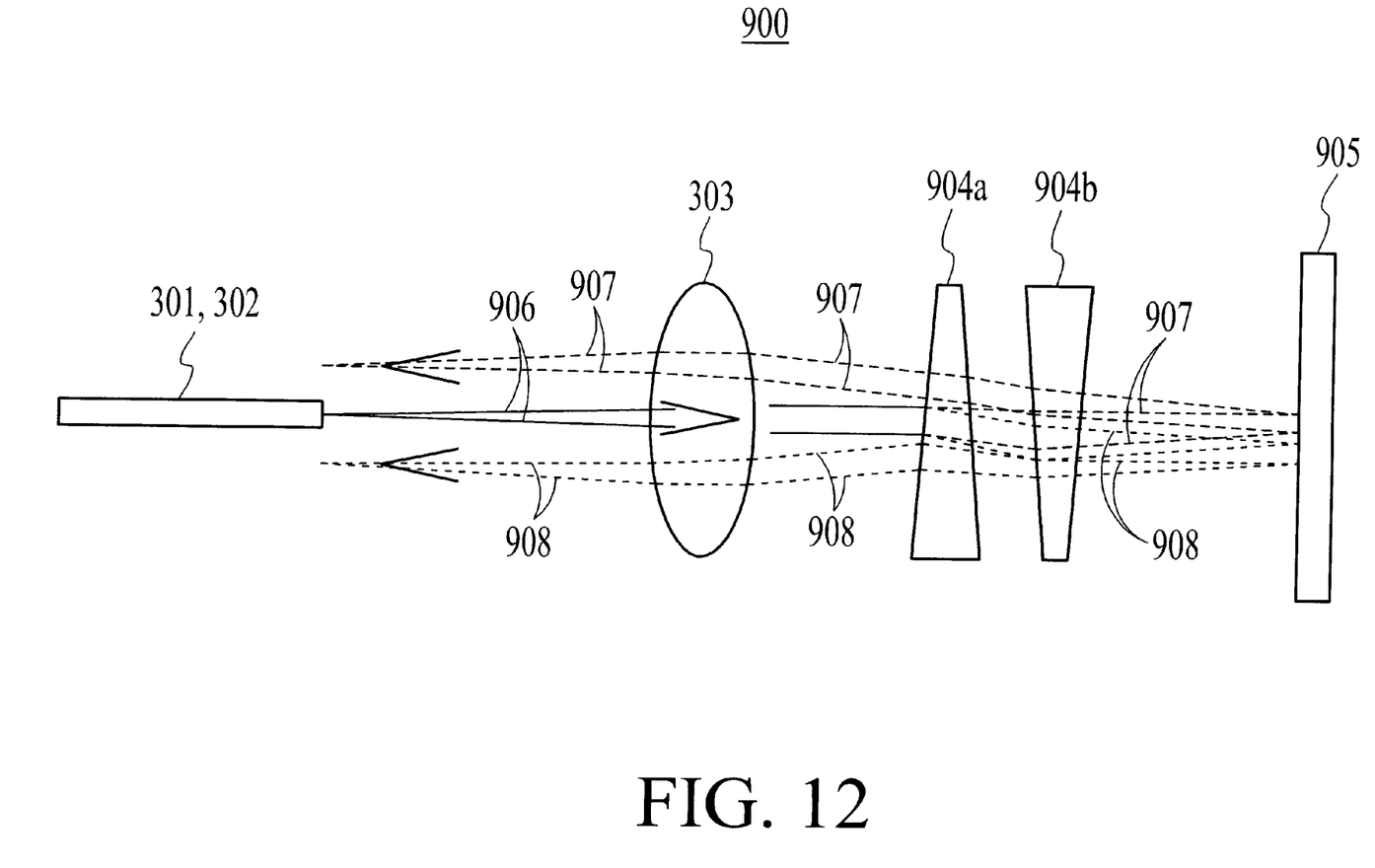
FIG. 12 is an illustration of the optical pathways of signals comprising odd channels through the second preferred embodiment of the dense optical channel comb filter in accordance with the present invention.

FIGS. 11 and 12 illustrate the optical pathways of signals comprising even and odd channels, respectively, through the second preferred embodiment of the dense optical comb filter in accordance with the present invention. In FIGS. 11 and 12, the positive x-axis is taken as the main axis of comb filter 900 in the direction of initial propagation of signal 906. The light of signal 906 emerges from fiber 301 as a diverging cone. Because lens 303 is centered at a distance, $f$, from the face of fiber 301 from which this signal light emanates, the lens 303 intercepts this diverging signal 906 and collimates it into a parallel beam, as shown in both FIG. 11 and FIG. 12. After passing through lens 303, the signal 906 propagates along the positive x-axis until it is transmitted through the first birefringent wedge 904a and then the second birefringent wedge 904b. After passing through the first wedge 904a, the signal 906 is separated into two collimated sub-signals 907 and 908 (FIGS. 10–12). Subsequently, after passing through the second birefringent wedge 904b, the propagation directions of the sub-signals 907–908 are at angles of $-\alpha$ and $\alpha$, respectively, with respect to the positive x-axis (FIG. 9).

After passing through the second birefringent wedge 904b, the two sub-signals 907–908 travel to and are reflected by the non-linear interferometer 905. Because the non-linear interferometer 905 is perpendicular to the x-axis and reflects the sub-signals 907–908 as if it were a simple mirror, then the reflected portions of sub-signals 907 and 908 make angles of $(\pi+\alpha)$ and $(\pi-\alpha)$, respectively, with respect to the direction of the positive x-axis. Thus, the propagation direction of the reflected portion of sub-signal 907 is anti-parallel to the portion of sub-signal 908 just prior to reflection of sub-signal 908 by the non-linear interferometer 905. Similarly, the propagation direction of the reflected portion of sub-signal 908 is anti-parallel to the portion of sub-signal 907 just prior to reflection of sub-signal 907 by the non-linear interferometer 905. After reflection by non-linear interferometer 905, both sub-signals 907 and 908 then pass through the birefringent wedge 904b and then the first birefringent wedge 904a in the reverse direction. Two separate cases may be distinguished, depending upon whether sub-signals 907 and 908 comprise even channels or odd channels, as illustrated in FIG. 11 and FIG. 12, respectively.

If sub-signals 907 and 908 comprise a wavelength belonging to the set of even channels (FIG. 11), then each of their respective lights incurs a 90° rotation of its polarization direction during reflection by the non-linear interferometer 905. Thus, when sub-signals 907–908 comprise even channels, the reflected portion of sub-signal 907 (sub-signal 908) comprises the same polarization orientation as and an anti-parallel propagation direction to the portion of sub-signal 908 (sub-signal 907) just prior to reflection by the non-linear interferometer 905. In this case, therefore, the direction of the reflected portion of sub-signal 907 (sub-signal 908) re-traces, in a reverse direction, that of the pre-reflection portion of the sub-signal 908 (sub-signal 907) through the birefringent wedges 904a–904b and the lens 303.

If the sub-signals 907 and 908 comprise a wavelength belonging to the set of odd channels (FIG. 12), then there is no change in polarization direction during reflection by the non-linear interferometer 905. Because the refraction, by each of the birefringent wedges 904a–904b, depends upon the polarization direction of light propagating therethrough, then, necessarily, the propagation directions of the reflected portions of the odd-channel sub-signals 907–908 (FIG. 12) through the wedges 904a–904b are different from the propagation directions of the respective even-channel sub-signals 907–908 (FIG. 11).

After passing through the wedge 904b and the wedge 904a in the return direction, the collimated beam sub-signals 907 and 908 are intercepted by lens 303 which brings each to a focus on the side of lens 303 facing the fibers 301 and 302. As shown in FIG. 11, returning even-channel sub-signals 907 and 908 propagate parallel to the negative x-axis as they are intercepted by lens 303, and are thus brought to foci that are coincident with each other and also with the lens focal plane. Since output fiber 302 is also disposed at the focal plane of lens 303, these even-channel sub-signals are intercepted by and transferred to output fiber 302. The even-channel signals 306 are thus regenerated at output fiber 302 from the convergence of the even-channel sub-signals 907 and 908.

Conversely, as shown in FIG. 12, because the returning odd-channel sub-signals 907 and 908 do not propagate parallel to the negative x-axis prior to being intercepted by lens 303, they are brought to separate foci which do not coincide with the output fiber 302. Such sub-signals are thus lost from the system. In this manner, the comb filter 900 performs as a dense optical channel comb filter that transfers signals belonging to the set of even channels from input fiber 301 to output fiber 302 while simultaneously rejecting signals belonging to the odd channels without significant temperature or wavelength dependence.

A mechanism for minimizing channel leakage in a dense wavelength division system has been disclosed. The mechanism of the present invention uses a dense channel comb filter which comprises at least one birefringent wedge and a non-linear interferometer to minimize channel leakage. The dense optical channel comb filter of the present invention separates an optical signal into optical channels and transmits every second channel and eliminates all other channels. The present invention provides an improved efficiency of separation of channels when used to supplement an optical channel separator. The present invention also provides a higher tolerance to drifts than is provided by conventional optical filters due to the increase in the widths of the pass bands. The materials required to manufacture and implement the dense optical channel comb filter in accordance with the present invention are readily available. The present invention thus does not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer for separating an optical signal into optical channels, comprising:
   at least one channel separator; and
   at least one dense optical channel comb filter optically coupled to the channel separator, comprising:
      a lens optically coupled to the at least one channel separator disposed at a distance equal to the focal length of the lens,
      a first birefringent wedge optically coupled to the lens at a side opposite to the at least one channel separator,
      a second birefringent wedge optically coupled to the first birefringent wedge at a side opposite to the lens, and
      a non-linear interferometer optically coupled to the second birefringent wedge at a side opposite to the first birefringent wedge.

2. The multiplexer of claim 1, further comprising an inputting means optically coupled to the at least one channel separator, the inputting means comprising at least one optic fiber.

3. The multiplexer of claim 1, further comprising an outputting means optically coupled to at least one dense optical channel comb filter, the outputting means comprising at least one optic fiber.

4. The multiplexer of claim 1, wherein the non-linear interferometer comprises:
   a first glass plate optically coupled to a second glass plate, forming a cavity;
   a first reflective coating residing inside the cavity and on the second glass plate;
   a second reflective coating residing inside the cavity and on the first glass plate;
   a first waveplate residing inside the cavity between the first and second glass plates; and
   a second waveplate residing outside the cavity and optically coupled to the first glass plate.

5. The multiplexer of claim 4, wherein the first reflective coating comprises a reflective coating with a reflectivity of 100%.

6. The multiplexer of claim 4, wherein the second reflective coating comprises a reflective coating with a reflectivity of approximately 18%.

7. The multiplexer of claim 4, wherein the first waveplate comprises a 8/4 waveplate.

8. The multiplexer of claim 4, wherein the second waveplate comprises a $\lambda/8$ waveplate.

9. The multiplexer of claim 1, wherein the second birefringent wedge is inverted with respect to the first birefringent wedge.

10. A dense optical channel comb filter for minimizing channel leakage, comprising:
    a lens optically coupled to an inputting means disposed at a distance equal to a focal length of the lens;
    a first birefringent wedge optically coupled to the lens at a side opposite to the inputting means;
    a second birefringent wedge optically coupled to the first birefringent wedge at a side opposite to the lens; and
    a non-linear interferometer optically coupled to the second birefringent wedge at a side opposite to the first birefringent wedge.

11. The filter of claim 10, wherein the second birefringent wedge is inverted with respect to the first birefringent wedge.

12. The filter of claim 10, wherein the non-linear interferometer comprises:
    a first glass plate optically coupled to a second glass plate, forming a cavity;
    a first reflective coating residing inside the cavity and on the second glass plate;
    a second reflective coating residing inside the cavity and on the first glass plate;
    a first waveplate residing inside the cavity between the first and second glass plates; and
    a second waveplate residing outside the cavity and optically coupled to the first glass plate.

13. The filter of claim 12, wherein the first reflective coating comprises a reflective coating with a reflectivity of 100%.

14. The filter of claim 12, wherein the second reflective coating comprises a reflective coating with a reflectivity of approximately 18%.

15. The filter of claim 12, wherein the first waveplate comprises a 8/4 waveplate.

16. The filter of claim 12, wherein the second waveplate comprises a $\lambda/8$ waveplate.

17. A method for filtering an optical signal, comprising the steps of:
    (a) separating the optical signal into a first sub-signal and a second sub-signal, wherein a polarization plane of the first sub-signal is at a right angle to a polarization plane of the second sub-signal;
    (b) reflecting the first and second sub-signals, wherein a polarization plane of every second channel of the first and second sub-signals is rotated by approximately 90 degrees; and
    (c) deflecting each channel of the first and second sub-signals based upon a direction of a polarization plane of each channel.

18. A method for providing a dense wavelength multiplexer, comprising the steps of:
    (a) providing at least one channel separator;
    (b) providing a lens disposed at a distance equal to the focal length of the lens, wherein the lens is capable of being optically coupled to the at least one channel separator;
    (c) providing a first birefringent wedge at a side of the lens opposite to the at least one channel separator, wherein the first birefringent wedge is capable of being optically coupled to the lens; and
    (d) providing a non-linear interferometer at a side of the first birefringent wedge opposite to the lens, wherein the non-linear interferometer is capable of being optically coupled to the first birefringent wedge.

19. The method of claim 18, further comprising:
    (e) providing a second birefringent wedge between the first birefringent wedge and the non-linear interferometer, wherein the second birefringent wedge is capable of being optically coupled to the first birefringent wedge and the non-linear interferometer.

* * * * *